United States Patent [19]
Trame et al.

[11] Patent Number: 5,687,790
[45] Date of Patent: Nov. 18, 1997

[54] HEATER, VENTILATION AND AIR CONDITIONING ASSEMBLY FOR A MOTOR VEHICLE

[75] Inventors: John V. Trame, Centerville, Ohio; Robert P. Hennessee, Rochester Hills, Mich.

[73] Assignee: Chrysler Corporation, Auburn Hills, Mich.

[21] Appl. No.: 578,368

[22] Filed: Dec. 26, 1995

[51] Int. Cl.$^6$ ........................................... F25B 29/00
[52] U.S. Cl. ........................... 165/42; 165/43; 165/103; 237/12.3 A; 237/12.3 B
[58] Field of Search ............................ 165/42, 43, 103; 237/123 A, 123 B

[56] References Cited

U.S. PATENT DOCUMENTS

| | | | |
|---|---|---|---|
| 4,223,720 | 9/1980 | Poirier d'Ange d'Orsay | 165/43 |
| 4,383,642 | 5/1983 | Sumikawa et al. | 237/12.3 A |
| 4,390,124 | 6/1983 | Nilsson | 237/12.3 A |
| 4,515,208 | 5/1985 | Sakurai et al. | 237/12.3 A |
| 4,593,852 | 6/1986 | Tajima et al. | 237/12.3 A |
| 4,852,638 | 8/1989 | Hildebrand et al. | 237/12.3 A |
| 4,852,639 | 8/1989 | Horiguchi et al. | 237/12.3 A |
| 4,898,325 | 2/1990 | Sakurada | 237/12.3 A |
| 5,042,566 | 8/1991 | Hildebrand | 165/43 |

FOREIGN PATENT DOCUMENTS

| | | | |
|---|---|---|---|
| 3544922 | 6/1987 | Germany | 237/12.3 A |
| 0193918 | 8/1986 | Japan | 237/12.3 A |

*Primary Examiner*—John K. Ford
*Attorney, Agent, or Firm*—Kenneth H. MacLean

[57] ABSTRACT

A heater, ventilation and air conditioning assembly for a motor vehicle that includes a movable vane (44) that can be moved or pivoted through an assembly of levers (56) and (70) to vary the range of motion and rate of motion of the vane 44 with respect to a pivoting temperature door (30).

5 Claims, 3 Drawing Sheets

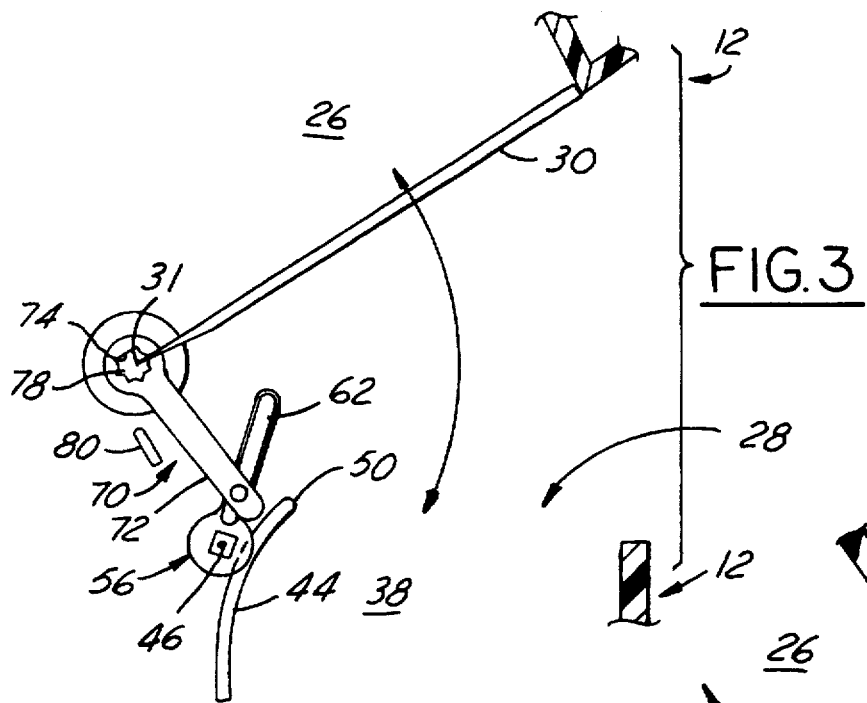
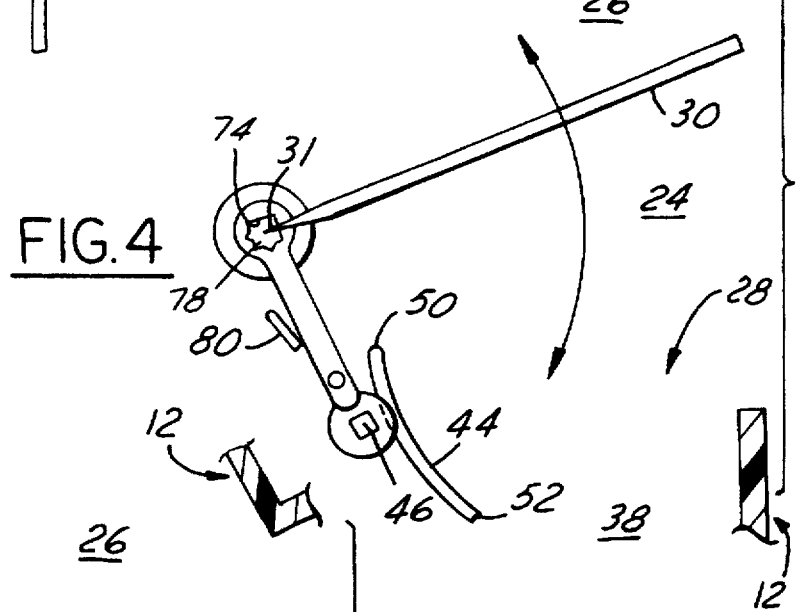
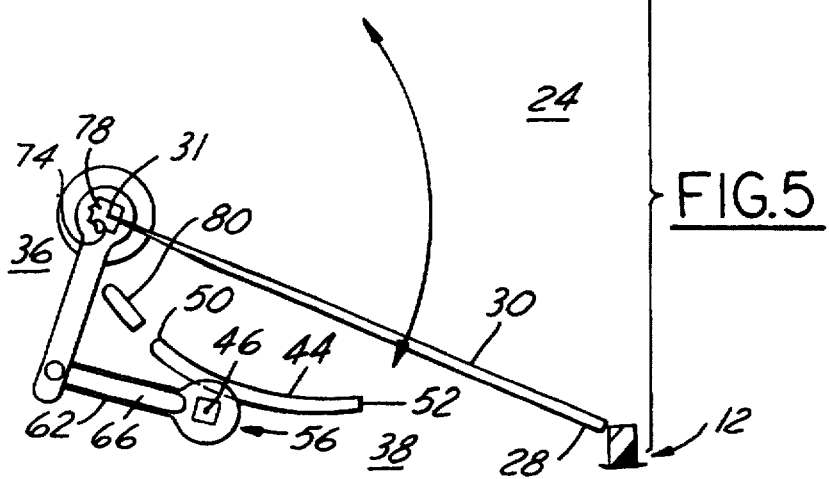

HEATER, VENTILATION AND AIR CONDITIONING ASSEMBLY FOR A MOTOR VEHICLE

TECHNICAL FIELD

The field of this invention relates to a heater, ventilation and air conditioning assembly for a motor vehicle.

BACKGROUND OF THE DISCLOSURE

Heater, ventilation and air conditioning assemblies for motor vehicles, (commonly referred to by the acronym HVACs) heat, cool and provide fresh air flow to the passenger compartment of a motor vehicle. Because of the year round use of most motor vehicles and the wide temperature fluctuations of the ambient exterior air, the flow of air through the HVAC must be either heated, cooled, dehumidified or otherwise controlled to maintain comfort in the passenger compartment.

Commonly an HVAC has an inlet channel which has an air conditioning evaporator mounted therein. When the air conditioning is activated, the evaporator cools and dehumidifies the incoming air. The air can then be diverted into either a cold air opening and directly to the mixing channel and through the outlets into the passenger compartment. Alternatively, the air may be directed through a heater core channel which houses the heater core which heats the air passing therethrough. The air after being heated then is directed to the mixing channel and through the outlets into the passenger compartment. A temperature door is pivotally mounted to adjust the volume of air flow through each of the cold air opening and heater core channel for controlling the resulting temperature of the outlet air after the air from the two sources are mixed in the mixing channel.

It is desirable to have the duct work within the HVACs designed for optimum air flow from the inlet and out through the outlets. However, this objective of optimum air flow is difficult to achieve because air flow within the HVAC divides up and flows through two different routes and flows into the mixing chamber from two different directions. What is optimum design for air flow through the cold air opening and into the mixing chamber often causes extra turbulence and unneeded back pressure for air flow through the heater core and vice versa. As a result, designs for air flow through both the heater core channel and through the cold air opening are often a compromise between the two optimum flows for each path.

Other compromises to optimum air flow are also introduced by the need to blend the air. The duct work also adequately blend the air from the heater core channel with the air passing through the cold air opening within the outlet channel to provide uniform air temperature exiting the different upper and lower outlets leading into the passenger compartment.

Many HVACs furthermore have a hi-level mode. A bi-level mode provides simultaneous air circulation to both the panel upper outlets and lower duct outlets. This mode is often desired in mild sunny weather. During mild sunny weather, the sun often warms the upper portion of the passenger compartment including the body portion of the occupants while the lower portion of the passenger compartment where a passenger's legs and feet are remains concealed from the sunshine and remains cooler. Thus, this mode desirably provides warmer air to the floor outlets and lower portion of the passenger compartment and cooler air to the upper outlets. The warm air rises from the floor and the cooler air from the upper outlets in the instrument panel sink thereby providing more even temperature within the passenger compartment. Even while maintaining the temperature differential between the upper and lower outlets, the HVAC needs to keep the temperature uniform at all upper outlets and also uniform at all lower outlets. Thus, the calibration of HVACs with the bi-level mode is further complicated and compromised to take into account the bi-level feature.

What is needed is movable and variable vane within the HVAC that provides adjustable duct work that improves the air flow and blending of air from the heater core channel and bypass door opening.

SUMMARY OF THE DISCLOSURE

In accordance with one aspect of the invention, a heater, ventilation and air conditioning (HVAC) assembly for a motor vehicle includes movable vane that is movable relative to the temperature adjustment door. The HVAC includes inlet for receiving incoming air and an inlet duct in communication with the inlet and housing an air conditioning evaporator for cooling and dehumidifying the air when actuated. A heater core channel is in communication with a downstream end of the inlet duct. The heater core channel houses a heater core for heating passing air. An outlet mixing channel is in communication with the heater core channel and leads to at least one outlet. A cold air opening when open leads from a downstream end of the inlet duct to the outlet mixing channel thereby bypassing the heater core channel. The temperature adjustment door is mounted for motion between a first position that closes the heater core channel and opens the cold air opening and a second position that closes the cold air opening and opens the heater core channel. The door is variably adjustable for other positions intermediate the first and second positions for allowing blending of different proportions of air passing through the heater core channel and through the cold air opening when recombining in the outlet mixing channel.

The movable vane is movably mounted in one of the inlet channel, heater core channel or outlet mixing channel. The vane is movably mounted for motion between a first position that corresponds when the temperature adjustment door is in its first position and a second position that corresponds when the door is in its second position. The door and the vane are preferably pivotally movable about respective first and second pivotal axes. It is desirable that the angular change of the vane when in its respective first and second positions are substantially different than the angular change of the door when in its respective first and second positions. Preferably, the angular change of the vane is substantially greater than the angular change of the door when in its respective first and second positions. It is also preferable that the rate of change of the vane from its respective first position to second position is variable with respect to the rate of the change of the door from its respective first position to second position.

In one embodiment, the door and vane are mechanically linked together such that motion of the door from its respective first position to its second position causes the vane to move from its respective first position to its second position. Desirably, the door and vane are mechanically linked together via a cam and pin linkage to provide varied motion of the vane with respect to the door. In other applications, other linkages such as gears may by suitable.

In accordance with another aspect of the invention, an HVAC has a temperature door and a vane both being pivotally movable about a respective spaced apart pivotal axis between the door and vane respective first and second positions. The door and vane are preferably mechanically linked together such that motion of the door from its respective first position to its second position causes the vane to move from its respective first position to its second position. The door and vane are preferably mechanically linked together via a cam and pin linkage to provide varied motion of the vane with respect to the door.

In accordance with broader aspect of the invention, a vane is mounted for movement within the duct work of an HVAC. The vane's movement is differentiated from movement of a temperature door that provide selective access to at least one of a heater core channel or cold air opening bypassing the heater core channel, such that air flow and mixing of air is optimized for all positions of the temperature door.

BRIEF DESCRIPTION OF THE DRAWINGS

Reference now is made to the accompanying drawings in which:

FIG. 3 is an enlarged side elevational view illustrating the door and vane in their respective first positions;

FIG. 4 is a view similar to FIG. 3 illustrating the door and vane in respective intermediate positions;

FIG. 5 is a view similar to FIG. 3 illustrating the door and vane in their respective second positions;

DETAILED DESCRIPTION OF THE PREFERRED EMBODIMENT

Figure 1:
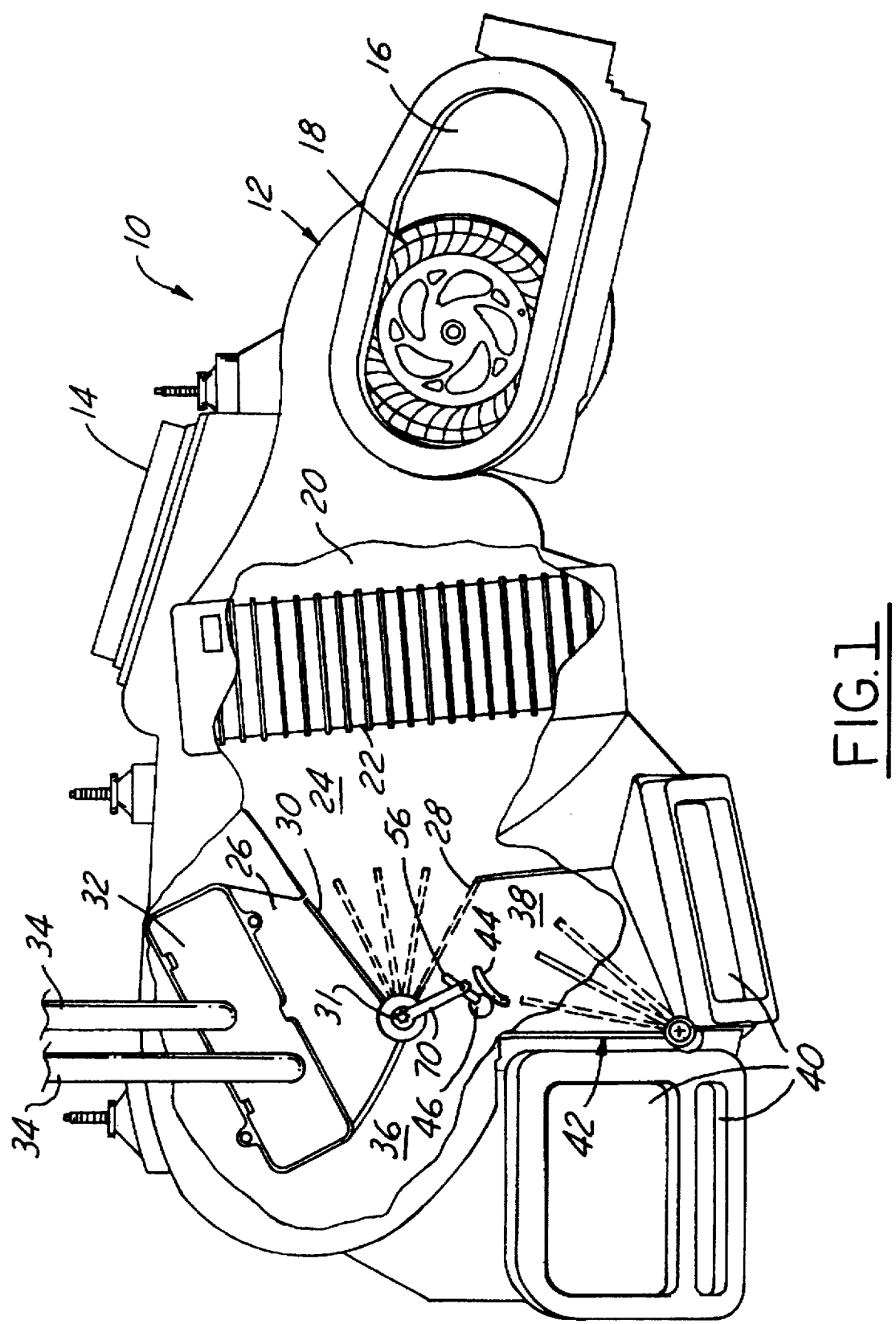
FIG. 1 is a side elevational and partially segmented view of an HVAC in accordance with one embodiment of the invention.

Referring now to FIG. 1, a heater, ventilation and air conditioning assembly 10 commonly referred to as an HVAC, has a housing 12 that includes an ambient exterior air inlet 14 and a interior passenger compartment inlet 16. The HVAC housing houses a fan 18 for providing air flow through the HVAC. The inlets 14 and 16 are in communication with inlet channel 20. The HVAC has an air conditioning evaporator 22 mounted within the inlet channel 20. The air flow through the inlet channel is forced to pass through the evaporator 22 such that the air is cooled by it when the evaporator is actively cooling.

The inlet channel 20 has its downstream section 24 in selective communication with a heater core channel 26, and a cold air opening 28. A temperature door 30 is pivotably mounted about pivot axis 31 to pivot between two positions, one position (shown in solid in FIG. 1) which substantially blocks air flow into the heater core channel 26 and opens the cold air opening 28 leading directly to outlet mixing channel 38. Another position of the door 30 substantially blocks the cold air opening 28 and opens the heater core channel 26 (shown in phantom in FIG. 1). The door can pivot and be retained also in intermediate positions between the above discussed first and second positions (also shown in phantom in FIG. 1).

The heater core channel 26 houses a heater core 32. The air flow through the heater core channel 26 is forced to pass through the heater core such that the air is heated by it when the heater core is circulated with heated coolant via pipes 34 from the engine. The heated air then passes through the downstream end 36 of heater core channel 26 and into the outlet mixing channel 38. The downstream end of the mixing channel 38 has outlets 40 which direct the air flow to the various floor, door, defroster, and instrument panel outlets (not shown). A delivery mode door 42 is pivotally mounted in front of the outlets 40 to selectively direct air to the desired outlets 40.

Figure 2:
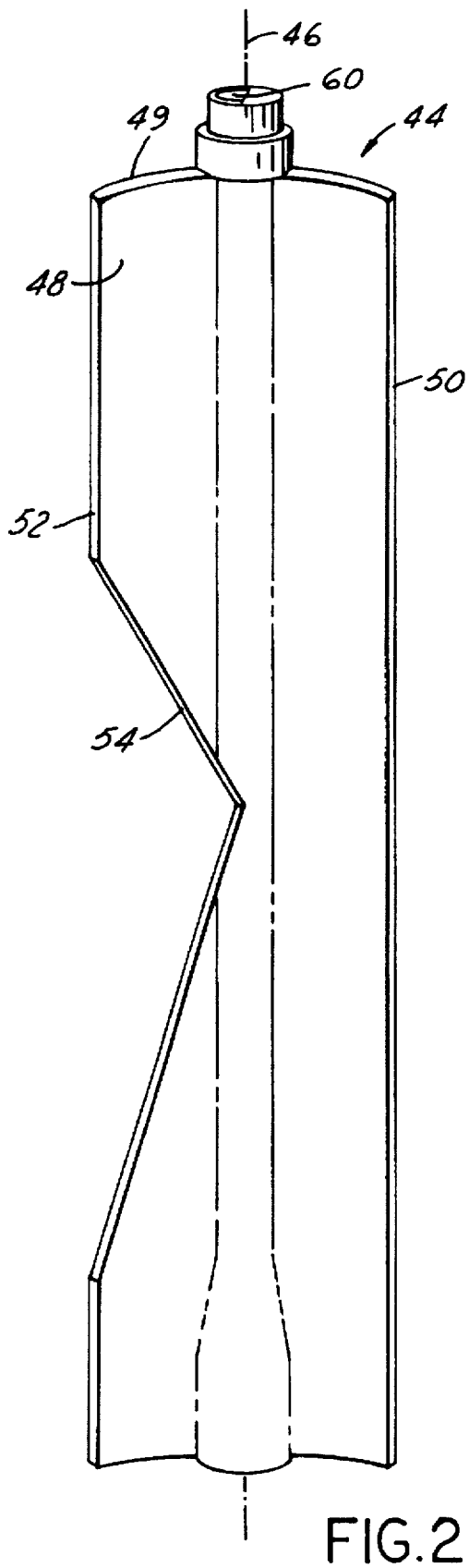
FIG. 2 is a front elevational view of the movable vane shown in FIG. 1.

A movable vane 44 is pivotally mounted within the mixing channel 38 about pivot axis 46. As clearly shown in FIG. 2, the vane 44 is contoured substantially along the pivot axis to present a concave one side 48 and convex other side 49. One edge 50 is substantially straight and an opposite edge 52 has a v-shaped notch 54 therein.

The pivot axis 46 is in proximity to the vane 44 and on the convex side 49 thereof.

It is understood that the vane may have different shapes for promoting calibration of other shaped HVAC. The vane may also have differently shaped edges to help direct flow and blending of the air in the other HVACs.

The vane is mounted such that the pivot axis 46 substantially traverses the direction of the air flow within the mixing channel 38 from either downstream end 36 of heater core channel 26 or from cold air opening 28 and to outlets 40. At one end of the vane 44, a vane lever 56 is connected via a d-shaped stem 58 to a d-shaped aperture 60 such that the lever is non-rotatable with respect to the vane and can drivingly pivot the vane about axis 46. As shown clearly in FIGS. 6 and 7, the lever has a slotted elongated section 62 with slot 64 and cam edges 66.

Figure 6:
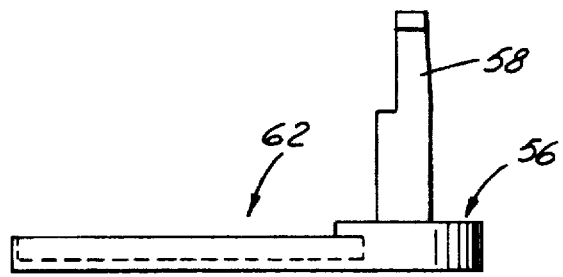
FIG. 6 is a front elevational view of the vane lever member shown in FIG. 1.
Figure 7:
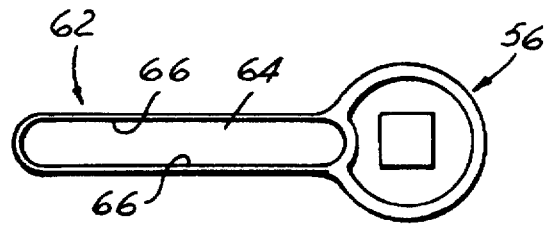
FIG. 7 is a side plan view of the vane lever shown in FIG. 6.

The slot 64 radially extends out from the axis 46 as shown in FIGS. 6 and 7.

Figure 8:
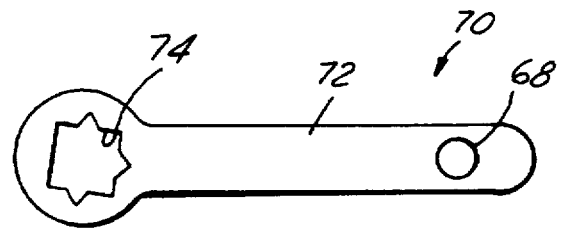
FIG. 8 is a side plan view of the temperature door lever for the door shown in FIG. 1.
Figure 9:
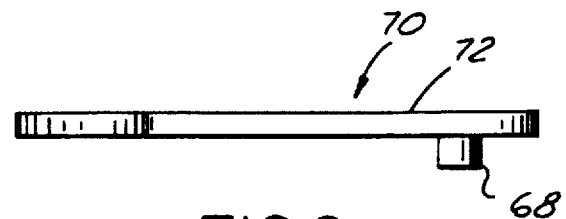
FIG. 9 is a front elevational view of the temperature door lever member shown in FIG. 8.

The slot engages a drive pin 68 of blend door lever 70 that is clearly shown in FIGS. 8 and 9. The pin 68 is at the distal portion of elongated section 72 of door 30. The lever has a drive aperture 74 which engages about a drive stem 78. The drive stem 78 is rotated about pivot axis 31 with the motion of the door 30 caused by a motor or other conventional actuator device (not shown for simplicity of the drawings).

The relative motion of the vane 44 and door 30 can best be described with reference to FIGS. 3, 4, and 5. As shown in FIG. 3, the door 30 is in position to substantially close off heater core channel 26 from downstream section 24 of inlet duct 20. The cold air opening 28 is fully open which causes substantially all air flow to be directed from section 24 through opening 28 and into mixing channel 38. Substantially, no flow of air passes through channel 26 and back through downstream section 36 and back into mixing channel 38. As such, the vane 44 is desired to provide minimum back pressure back to opening 28 and thus has front edge 50 directly face cold air opening 28 with the contour of the vane providing a smooth turn into the mixing channel section 38 and toward outlets 40.

When the door 30 is moved to the position shown in FIG. 5, the cold air opening 28 is substantially blocked and substantially all air is directed from downstream end 24 into heater core channel 26 and back through downstream section 36 and into mixing channel 38. The lever 70 is rotated along with door 30 such that the pin 68 drives within slot 64 to rotate the vane lever 56 and thus vane 44. Because substantially all the air passes from channel section 36 into channel 38, the front edge 50 substantially faces channel section 36. A fixed vane 80 may be positioned upstream from edge 50 in this position. The vane 44 appears to be tucked under the door 30 to provide little back pressure into channel section 36. While the door 30 has undergone a rotation of approximately 60° from the positions in FIG. 3 to the position in FIG. 5, the vane 44 has been pivoted approximately 90°. It should be understood that for other HVACs with other profiles, levers 56 and 70 may be constructed to vary the extent of the vane pivot motion range relative to the door pivot motion range. It is foreseen the other HVACs may even have total profiles that require the door 30 to pivot through a substantially greater range than the vane 44.

An intermediate position of the door 30 and vane 44 is illustrated in FIG. 4. In this position, the door is slightly pivoted from the position shown in FIG. 3. The levers 56, 70 and the shape of cam slot 62 is structured to pivot the vane substantially from the position shown in FIG. 3. The vane 44 faces the cold air opening 28 and edge 52 is functional to allow the notch 54 to function to help blend air and direct air to the appropriate outlets 40 downstream from mixing channel section 38.

It should be noted that the position of the vane shown in FIG. 4 is relatively closer to the position shown in FIG. 5 than the one shown in FIG. 3. In other words, the rate of change of the vane per unit change of the door 30 varies significantly during the entire range of the door motion. It is foreseen that fixed rates may be constant for other HVAC application. If fixed rates of change are applicable, the lever 56, 70 and their accompanying pin 68 and slot 62 may be replaced by a gear mechanism that is interposed between the door 30 and vane 44.

In this fashion, the vane 44 when properly shaped and positioned, can provide for an HVAC that provides for optimum flow and blending of air regardless of the position of the door 30. Designers do not have to be faced with the necessity of compromising air flow when faced with varying air flow routes through the HVAC. Furthermore, the edges of the vane may selectively operate to change the mix, blend and flow characteristics of the air as the door is positioned through its entire range of motion. The compromises of fixed wall HVACs can be obviated by using movable vanes which appropriately move with relation to the air flow through the HVAC as determines by the position of the door 30.

Other variations and modifications are possible without departing from the scope and spirit of the present invention as defined by the appended claims.

The embodiments in which an exclusive property or privilege is claimed are defined as follows:

1. A heater, ventilation and air conditioning assembly for a motor vehicle, said assembly having;

an inlet for receiving incoming air;

an inlet duct in communication with the inlet and housing an air conditioning evaporator for cooling and dehumidifying said air when actuated;

a heater core channel in communication with a downstream end of the inlet duct, said heater core channel housing a heater core for heating air passing through said heater core channel;

an outlet channel in communication with the heater core channel and leading to at least one outlet;

a cold air opening that when open leads from a downstream end of the inlet duct to the outlet channel thereby bypassing the heater core channel;

a pivotal temperature adjustment door mounted for motion between a first position that opens said cold air opening and closes off said heater core channel and a second position that closes said cold air opening and opens said heater core channel, said door being variably adjustable for other positions intermediate said first and second positions for allowing blending of different proportions of air passing through said heater core channel and said cold air opening when recombining in said outlet channel; the improvement characterized by:

a movable vane in one of the inlet channel, heater core channel or said outlet channel;

said vane being movably mounted for motion between a first position that corresponds when said temperature adjustment door is in its first position and a second position that corresponds when said door is in its second position; and said door and movable vane being operably connected together such that said door and said movable vane are relatively movable with respect to each other;

said door and said vane both being pivotally movable about a respective pivotal axis between the door and vane respective first and second positions, the angular change of the vane when in its respective first and second positions being substantially different than the angular change of the door when in its respective first and second positions;

said door and said vane being mechanically linked together via a cam and pin linkage to provide varied motion of the vane with respect to the door;

said cam provided by an elongated vane lever with a slot extending therethrough;

said slot radially aligned and extending outwardly from said pivotal axis of said vane: and said vane having a convex side and a concave side and mounted such that said pivotal axis of said vane is in proximity with said vane and on the convex side thereof.

2. A heater, ventilation and air conditioning assembly as defined in claim 1 further characterized by:

the angular change of the vane when in its respective first and second positions being substantially greater than the angular change of the door when in its respective first and second positions.

3. A heater, ventilation and air conditioning assembly as defined in claim 2 further characterized by:

the rate of the change of the vane from its respective first position to second position being variable with respect to the rate of the change of the door from its respective first position to second position.

4. A heater, ventilation and air conditioning assembly as defined in claim 3 further characterized by:

at least one edge of the vane being shaped to promote blending of air from the cold air opening with heated air that has passed through the heater core channel.

5. A heater ventilation and air conditioning assembly as defined in claim 4 further characterized by:

said at least one edge having a notch therein for allowing passage of air therethrough.

* * * * *